(12) United States Patent
Bletsos et al.

(10) Patent No.: US 7,491,433 B2
(45) Date of Patent: Feb. 17, 2009

(54) COATED SHEET MATERIALS AND PACKAGES MADE THEREWITH

(75) Inventors: Ioannis V. Bletsos, Midlothian, VA (US); Michael G. Mikhael, Tucson, AZ (US); Jose Manuel Rodriguez-Parada, Hockessin, DE (US); Angelo Yializis, Tucson, AZ (US)

(73) Assignees: E.I. du Pont de Nemours and Company, Wilmington, DE (US); Sigma Laboratories of Arizona, Inc., Tucson, AZ (US)

( * ) Notice: Subject to any disclaimer, the term of this patent is extended or adjusted under 35 U.S.C. 154(b) by 404 days.

(21) Appl. No.: 11/282,553

(22) Filed: Nov. 18, 2005

(65) Prior Publication Data

US 2006/0078700 A1    Apr. 13, 2006

Related U.S. Application Data

(62) Division of application No. 10/465,399, filed on Jun. 19, 2003.

(60) Provisional application No. 60/391,864, filed on Jun. 26, 2002.

(51) Int. Cl.
*B29D 22/00* (2006.01)
*B29D 23/00* (2006.01)
*B32B 1/08* (2006.01)

(52) U.S. Cl. .............. 428/35.2; 428/35.7; 206/204; 206/484.1; 206/524.4; 383/102; 383/105

(58) Field of Classification Search .............. 428/306.6, 428/308.4, 308.8, 311.11, 315.9, 318.3, 319.7, 428/35.7, 35.2, 36.1, 34.9, 34.2, 131, 142, 428/36.5; 206/204, 484.1, 524.4; 383/102, 383/105
See application file for complete search history.

(56) References Cited

U.S. PATENT DOCUMENTS

| 3,625,353 | A |   | 12/1971 | Ishii |         |
|-----------|---|---|---------|-------|---------|
| 4,366,814 | A |   | 1/1983  | Riedel |        |
| 4,647,818 | A |   | 3/1987  | Ham   |         |
| 4,908,236 | A | * | 3/1990  | Pitt et al. | 427/245 |
| 4,913,307 | A |   | 4/1990  | Takata et al. |   |
| 5,120,585 | A | * | 6/1992  | Sutter et al. | 428/34.2 |
| 5,262,444 | A | * | 11/1993 | Rusincovitch et al. | 521/50.5 |

(Continued)

FOREIGN PATENT DOCUMENTS

DE    32 25 023 A    2/1983

(Continued)

OTHER PUBLICATIONS

R. E. Ellwanger, M. G. Mikhael, A. Yializis, A. Boufelfel, Vacuum Functionalization of Web Surfaces via Plasma Treatment & Polymer Coating, Vacuum & Coating Technology, Feb. 2001, pp. 22-29, vol. 2 No. 2.

*Primary Examiner*—Michael C Miggins (57) ABSTRACT

A coated porous sheet material comprising a gas permeable sheet material selected from the group consisting of flash spun plexifilamentary nonwoven sheet, spunbonded-film-spunbonded composite sheet, spun-laced polyester/wood pulp composite sheet and paper and a polymeric coating on at least one side thereof, wherein the permeability of the coated sheet material is substantially equivalent to the permeability of an equivalent sheet material without the coating. The coated porous sheet material is suitable for use in heat sealable packages.

12 Claims, 7 Drawing Sheets

U.S. PATENT DOCUMENTS

| | | |
|---|---|---|
| 5,286,407 A | 2/1994 | Inoue et al. |
| 5,725,909 A | 3/1998 | Shaw et al. |
| 5,800,884 A * | 9/1998 | D'Anna et al. ............ 428/35.7 |
| 5,869,172 A | 2/1999 | Caldwell |
| 5,910,224 A | 6/1999 | Morman |
| 6,270,841 B1 | 8/2001 | Mikhael et al. |
| 6,447,553 B1 | 9/2002 | Mikhael et al. |
| 6,468,595 B1 | 10/2002 | Mikhael et al. |
| 2003/0177909 A1 | 9/2003 | Koslow |
| 2004/0213918 A1 | 10/2004 | Mikhael et al. |

FOREIGN PATENT DOCUMENTS

| | | |
|---|---|---|
| DE | 44 28 291 A | 2/1996 |
| DE | 100 56 234 A | 5/2002 |
| EP | 0 242 460 A1 | 10/1987 |
| EP | 0 785 066 A | 7/1997 |
| EP | 0 831 033 A | 3/1998 |
| EP | 1 115 505 B1 | 5/2003 |
| JP | 58-191274 | 11/1983 |
| JP | 63264679 A * | 11/1988 |
| WO | WO 96 11992 A | 4/1996 |
| WO | WO 96 24541 A | 8/1996 |
| WO | WO 98/18852 A1 | 5/1998 |
| WO | WO 99/16931 A1 | 4/1999 |
| WO | WO 99/58755 A1 | 11/1999 |
| WO | WO 99/58756 A1 | 11/1999 |
| WO | WO 99/58757 A1 | 11/1999 |
| WO | WO 99/59185 A1 | 11/1999 |
| WO | WO 00/16913 A1 | 3/2000 |
| WO | WO 00/16914 A1 | 3/2000 |
| WO | WO 00/35602 A1 | 6/2000 |
| WO | WO 01/14627 A1 | 3/2001 |
| WO | WO 02/076576 A2 | 10/2002 |
| WO | 1 115 506 B1 | 11/2003 |

* cited by examiner

COATED SHEET MATERIALS AND PACKAGES MADE THEREWITH

FIELD OF THE INVENTION

The present invention relates to sheet materials such as nonwovens and paper coated with thin uniform polymeric coatings having porosity and permeability roughly equivalent to similar sheet materials which are uncoated. The invention also relates to heat sealed packages made from such coated sheets.

BACKGROUND OF THE INVENTION

Conventionally practiced means for coating substrates such as fibrous nonwoven and paper sheet materials include knife coating, hot melt coating, aqueous dispersion coating, gravure coating, direct blade coating, roll coating, air doctor coating and squeeze coating. There are a number of problems with these known methods. Knife coating results in almost a complete surface coverage of the substrate, thereby altering its porosity and permeability properties. Only a small fraction of the permeability of the substrate is maintained mainly through the cracks that appear on the coating after drying. Hot melt coating, depending on how it is applied, may result in three-dimensional dots or islands of coating between the fibers of the substrates such that some of the pores of the sheet material are covered completely while some are partially covered.

The coating lines used in conventional methods are large and costly in terms of investment. These methods are not flexible in that a lot of coating material must be deposited, which is also economically unattractive in situations when less material would be sufficient for the end use application of the coated sheet. Solution or dispersion coatings must be dried by evaporation of the solvent or dispersion liquid in a way that the coating or the substrate are not damaged, or their properties are not altered due to exposure at high temperatures, which is a slow and costly step. In addition, in solvent-based coatings, solvent recovery is required which adds cost and complexity to the process. Coatings applied as hot melts often alter the thermal characteristics of the substrates resulting in a compromise of their original properties. Another problem is that the air permeability and/or the porosity of the uncoated substrate is almost always sacrificed once the coating is applied. It would be desirable to enhance or impart certain desired properties to a sheet material while leaving the air permeability or porosity of the material unaffected.

U.S. Pat. No. 6,083,628 (Yializis) discloses a hybrid film comprising a first polymer base film having at least one plasma-treated surface and at least a second thin acrylate polymer film disposed along the plasma-treated surface of the base film. The acrylate film is formed by crosslinking a functionalized acrylate monomer or oligomer. The hybrid film may additionally comprise one or more metallic or ceramic coatings. The continuous process for forming the hybrid film takes place within a vacuum chamber and it consists of plasma treatment of the base film to functionalize the film followed by vapor deposition of the acrylate monomer onto the base film and then radiation polymerization to crosslink the monomer. The hybrid film is useful in a number of applications including food packaging to improve barrier properties. In food packaging applications, the acrylate coating is disclosed to be typically 0.5 to 2 µm thick.

U.S. Pat. No. 4,842,893 (Yializis et al.) discloses a method for coating a flexible substrate with a thin, "substantially continuous" film by depositing a vapor of polyfunctional acrylate monomer, under vacuum, on a movable substrate maintained at a temperature such that the monomer condenses on the substrate. The film is then exposed to radiation in order to polymerize the film. The acrylate monomer coating may be formed having a thickness of less than 4 µm, preferably less than 2 µm and possibly as thin as 0.1 µm. Such coatings are disclosed as useful in food packaging and protective coatings for metal or other substrates used in a variety of applications. U.S. Pat. No. 5,032,461 (Shaw et al.) discloses a similar process in which the process of U.S. Pat. No. 4,842,893 (Yializis et al.) is repeated many times to form a multi-layered thin film structure having as many as 4,000 or more layers.

WO 99/59185 and WO 99/58756 disclose a process for coating a substrate in which the substrate is treated with a plasma and coated with an acrylate monomer, and the monomer is subsequently radiation polymerized. The plasma is generated using hollow cathodes and focused at the surface of the substrate using an electromagnetic or magnetic focusing means. According to WO 99/59185, the monomer coating may be applied using a capillary drip system, by immersion in a solution bath or by vapor deposition. According to WO 99/58756, the monomer is applied by vapor deposition. WO 99/58756 also discloses apparatus for treating industrial sized, continuous substrates, specifically such as papermaking fabrics.

A system and apparatus useful for vacuum deposition polymer coating in which a web surface is coated with inorganic and organic compositions is described in R. E. Ellwanger, M. G. Mikhael, A. Yializis and A. Boufelfel, "Vacuum Functionalization of Web Surfaces via Plasma Treatment and Polymer Coating," *Vacuum Technology & Coating* (February 2001). The system includes treating the surface with plasma to remove low molecular weight material and to functionalize the surface with polar groups, depositing materials such as radiation curable acrylates onto the surface by vacuum evaporation coating and polymerization of acrylates with either an electron beam or an ultraviolet lamp. Among the applications of the coated substrates disclosed are high barrier films, printable films and nonwoven fabrics.

U.S. Pat. Nos. 5,260,095, 5,547,508 and 5,395,644 (Affinito) disclose a process and apparatus for forming solid polymer layers under vacuum, including the step of degassing the monomer material prior to injection into the vacuum. The advantages of forming polymer layers in a vacuum are said to be that photoinitiator is not needed for polymerization, polymerization is faster, there are fewer impurities in the polymer, and the polymer has a greater density and a smoother finished surface.

WO 98/18852 discloses a process for coating substrates such as polypropylene, polyester or nylon sheet materials with crosslinked acrylate and a layer of metal. Acrylate monomer is evaporated using flash evaporators and condensing the acrylate onto the sheet as a monomer film, and subsequently polymerizing the film by irradiation by electron beam or ultraviolet light. The adhesion of the acrylate on the sheet material is enhanced by plasma treatment immediately before coating. Both the plasma treatment and the coating are conducted under vacuum. The resulting coated sheet is has low oxygen permeability and is especially useful for food packaging.

U.S. Pat. Nos. 5,811,183 and 5,945,174 (Shaw et al.) disclose sheet materials including paper and film coated with acrylate polymer release coatings made by a process in which silicon-containing and fluorine-containing acrylate prepolymer having a molecular weight between 200 and 3000 is vapor deposited on the sheet material and radiation polymerized. Coating layers of between 0.5 and 1 μm thick are disclosed.

Fiber tear is an important problem with current medical packaging in which at least one fibrous sheet, such as a nonwoven or paper, and a second sheet have been heat sealed together to form a pocket capable of containing an article such as a sterile medical device. Fiber tear occurs during the opening of a package (i.e., upon peeling the two heat sealed sheets away from each other), and begins by separating a fiber or a bundle of fibers from the surface of the fibrous sheet. Fiber tear is unacceptable in the case of medical packaging because foreign particles are thereby introduced into the sterile field of the operating room. It would be desirable to eliminate the incidence of fiber tear from heat sealed packages which include at least one fibrous sheet, without greatly affecting the permeability of the fibrous sealing sheet.

Additionally, it is often necessary to provide printed information on the surface of heat sealed sheets, especially on medical packaging. However, depending upon the nature of the substrate used as the heat sealed sheet, such printing can be rubbed off of the surface rather easily. It would be desirable to provide a coating on such substrates which would enhance ink adhesion to the heat sealed sheet/package.

Additionally, many sheet materials which are used in protective environments, such as in the medical field for use in making gowns, masks, drapes, boots, etc., are subject to contact with fluids which may present either chemical or biological hazards. Accordingly, such materials are typically rated as to their resistance to fluid strike-through, particularly blood strike-through in the medical field. It would be desirable to provide coatings for such sheet materials which would enhance fluid strike-through resistance without significantly affecting the air permeability of the sheet, such that the wearer will enjoy increased protection from fluid strike-through while still being comfortable when wearing such garments.

SUMMARY OF THE INVENTION

In one embodiment, the present invention relates to a coated porous sheet material comprising a gas permeable sheet material selected from the group consisting of flash spun plexifilamentary nonwoven sheet, spunbonded-film-spunbonded composite sheet, spunbonded-meltblown-spunbonded composite sheet, spun-laced polyester/wood pulp composite sheet and paper and a polymeric coating covering at least one side thereof, wherein the permeability of the coated sheet material is substantially equivalent to the permeability of an equivalent sheet material without the coating.

In another embodiment, the present invention is directed to a coated fibrous sheet comprising a sheet selected from the group consisting of flash spun plexifilamentary nonwoven sheet, spunbonded-film-spunbonded composite sheet, spunbonded-meltblown-spunbonded composite sheet, spun-laced polyester/wood pulp composite sheet and paper, comprising fibers and interstitial spaces between the fibers, and a coating on at least one side of the sheet comprising a compound selected from the group consisting of oligomers, polyacrylates, low molecular weight (MW) polymers and mixtures thereof, and wherein the coating covers the fibers while leaving the interstitial spaces substantially uncovered.

A heat sealable package comprising a first material which comprises a fibrous sheet, said first material having a coating covering at least one side, said coating comprising polyacrylate having a thickness between about 0.05 and about 5 μm; and a second material; wherein portions of the coated side of the first material can be heat-sealed to the second material such that the first material and the second material cooperate to form a void capable of containing an article. The first material is preferably selected from the group consisting of flash spun plexifilamentary nonwoven sheet, spunbonded-meltblown-spunbonded composite sheet, and fibrous paper.

A coated fibrous sheet made by the process comprising (a) selecting a fibrous substrate selected from the group consisting of flash spun plexifilamentary nonwoven sheet, spunbonded-film-spunbonded composite sheet, spunbonded-meltblown-spunbonded composite sheet, spun-laced polyester/wood pulp composite sheet and paper, comprising fibers and interstitial spaces between the fibers; (b) atomizing monomers, oligomers or low MW polymers or solutions or slurries thereof; (c) vaporizing the monomers, oligomers or low MW polymers in a flash evaporator; (d) condensing the vapor substantially only on the surface of the fibers of the substrate; and (e) solidifying the condensate to form a coating; wherein the steps (c) through (e) are carried out in an environment of a vacuum on the order of between $1.33 \times 10^{-3}$ and $1.33 \times 10^{-7}$ kPa; and wherein the coating covers the fibers of the substrate while leaving the interstitial spaces between said fibers substantially uncovered.

BRIEF DESCRIPTION OF THE DRAWINGS

A more thorough explanation of the invention will be provided in the detailed description of the preferred embodiments of the invention in which reference will be made to the following drawings.

DETAILED DESCRIPTION OF THE INVENTION

The present inventors have discovered that the desired effects listed above can be obtained by vapor deposition of various, extremely thin polymeric coatings onto various substrates. The thickness of the vapor deposition coatings depends on the intended application. For example, for applications in which water, alcohol or oil repellency is important, the thickness could be a few tens of nanometers. For applications in which the substrate will be heat sealed to form a package, the coating may be thicker, for example between 0.05 and 5 μm. In any case, the thickness of the vapor deposition coatings is preferably on the order of the diameter of the fibers on the surface of the fibrous substrate. Thus, enough coating material is provided for the intended application and the vapor deposition coatings conform to the surface morphology of fibers without covering the interstitial spaces between fibers. The maximum coating thickness allowable before the permeability of the substrate is affected depends on the porosity of the substrate, that is, the void space that can be filled by the coating, and on the porosity of the coating.

Figure 1:
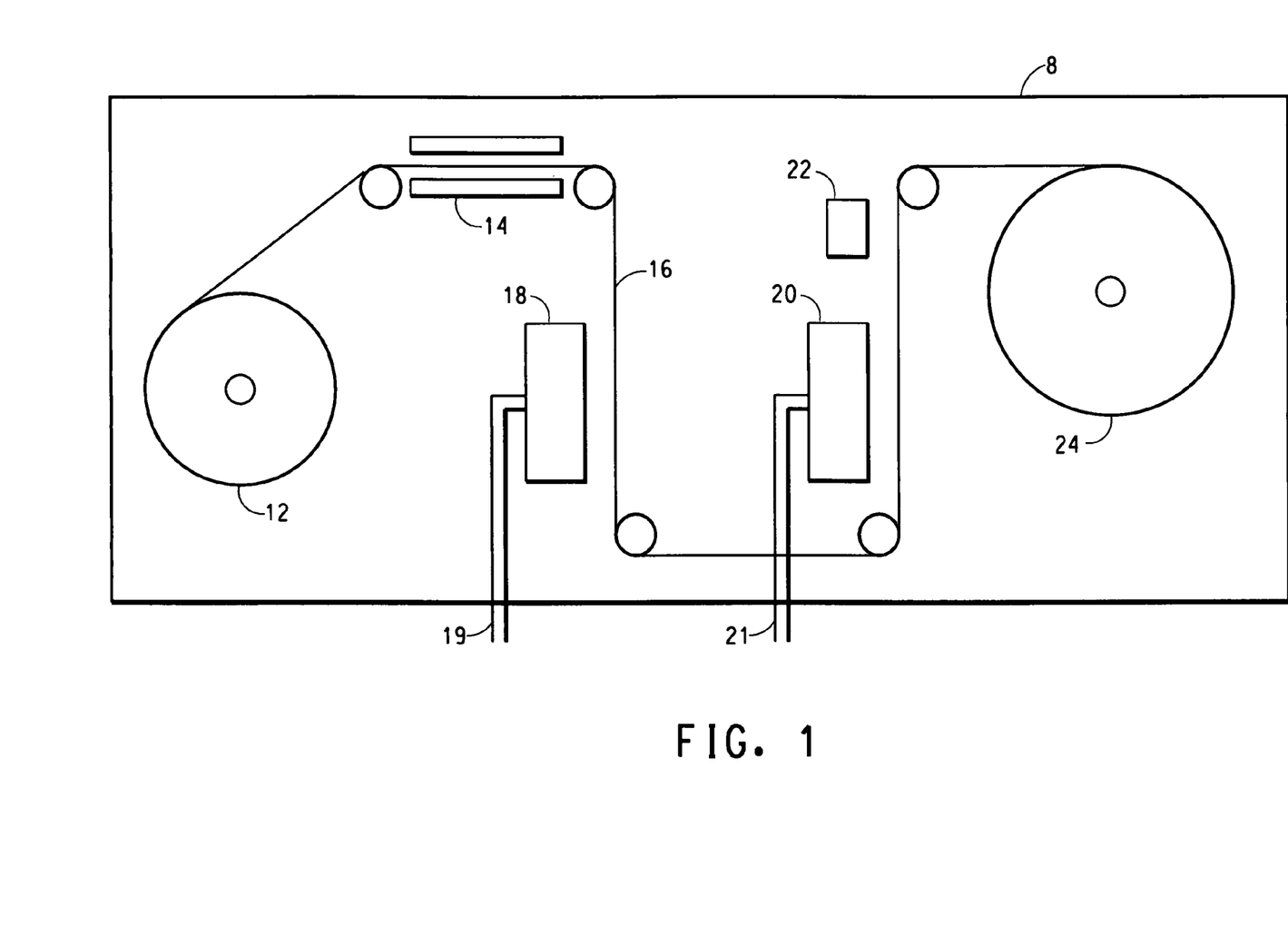
FIG. 1 is a schematic view of an apparatus for making the product of the invention.

The process used in making the coated substrate of the invention is illustrated by the schematic shown in FIG. 1. The process includes the optional initial step of plasma treating the substrate and the steps of vapor deposition coating the substrate and optional polymerization of the coating. The process is conducted in a vacuum chamber 8 maintained at an atmosphere of between $1.33 \times 10^{-3}$ and $1.33 \times 10^{-7}$ kPa. The substrate 16 to be coated is fed from feed roll 12.

The surface of the substrate 16 is first optionally exposed to plasma in order to remove loosely held low molecular weight compounds and functionalize its surface. Consequently, the surface energy of the substrate is modified to improve its wetting by the condensing vapor. The plasma treatment may be carried out by an apparatus 14 such as that disclosed in U.S. Pat. No. 6,066,826, WO 99/58757 and WO 99/59185.

The substrate is then coated with a radiation polymerizable monomer, an oligomer or a low MW polymer by a flash evaporation deposition process using a flash evaporation apparatus 18, the process and apparatus being described in U.S. Pat. Nos. 4,722,515, 4,696,719, 4,842,893, 4,954,371, 5,032,461 and 5,097,800, all of which are incorporated herein by reference. The radiation polymerizable monomer, oligomer or low MW polymer, in the form of a liquid or a slurry, should be provided in a continuous flow through inlet tubing 19 in order to create a uniform coating. The radiation polymerizable monomer, oligomer or low MW polymer liquid or slurry is preferably degassed prior to injecting it as a vapor into the vacuum chamber, as described in U.S. Pat. No. 5,547,508. In the event more than one coating is desired, multiple flash evaporation apparatuses 18 and 19 can be used in series, or if the additional coatings are desired on the opposite surface of substrate 16, additional flash evaporation apparatuses, 20 and 21 can be provided as shown in FIG. 1.

Cooling the substrate to be coated during vapor deposition enhances the efficiency of the monomer/oligomer condensation, as described in U.S. Pat. No. 4,842,893 and WO 98/18852. This may be accomplished by passing the substrate over a cooled drum as in U.S. Pat. No. 4,842,893 during vapor deposition. Cryoplates (not shown) may also be employed for this purpose, located such that they cool the substrate prior to vapor deposition.

The condensed coating is solidified within a matter of milliseconds after condensation onto the surface of the substrate, such as by using a radiation source 22 such as an electron beam or ultraviolet source to polymerize the monomer, and/or by natural solidification upon cooling of an oligomer or low MW polymer. In some cases, the oligomers can be further polymerized or crosslinked by the radiation source. In the case that an electron beam gun is chosen, the energy of the electrons should be sufficient to polymerize the coating in its entire thickness as described in U.S. Pat. No. 6,083,628, incorporated herein by reference. The polymerization of the monomer/oligomer coating is also described in U.S. Pat. Nos. 4,842,893, 4,954,371 and 5,032,461. For oligomers or low MW polymers that are solid at room temperature polymerization may not be required as described in U.S. Pat. No. 6,270,841. The coated substrate is finally wound up on a take-up roll 24.

The thickness of the coating is controlled by the line speed and vapor flux of the flash evaporator used in the vapor deposition process. As the coating thickness increases, the energy of the electron beam must be adjusted in order for the electrons to penetrate through the coating and achieve effective polymerization. For example, an electron beam at 10 kV and 120 mA can effectively polymerize acrylate coatings up to 2 μm thick.

It has been found that the above process may be applied to a fibrous substrate 16 such as a nonwoven sheet or paper to form a coated fibrous sheet. Suitable nonwoven sheets for use in the invention include flash spun plexifilamentary nonwoven sheets, spunbonded meltspun webs and composite sheets, spunbonded-meltblown-spunbonded composite sheets, spunbonded-film-spunbonded composite sheets, spun-laced polyester/wood pulp composite sheets and others.

The process described above has been employed to generate a number of new products, which are embodiments of the present invention.

In one embodiment of the invention, a porous sheet material is coated so as to cover at least one side with a polymeric material such that the permeability of the coated sheet material is substantially equivalent to the permeability of an equivalent sheet material without the coating; that is, the coating apparently has substantially no effect on the permeability of the material. By 'substantially equivalent permeability' is meant that the permeability of the coated sheet material is within 64% of the permeability of the uncoated sheet material, which is a normal variation of air permeability in uncoated Tyvek® flash spun plexifilamentary polyethylene sheet. The term "an equivalent sheet material" refers to the same sheet material as used in the coated sheet material prior to being coated. The term "permeability" is herein defined to mean the gas permeability, especially air permeability, as measured by the most appropriate test for the particular sheet material. For instance, for some materials, this would be Gurley Hill Porosity and for other materials, it would be Frazier Permeability. By "cover" or "covering" we mean that the entire fiber surface of the sheet material is coated with the coating material, unlike fabrics which are coated with a series of discrete patches of a coating material, leaving substantial portions of the fiber surface uncoated.

Porous sheet materials for use in this embodiment of the invention include nonwoven sheet and paper which are permeable to gases and/or liquids. A preferred example of a nonwoven sheet material suitable for use in the invention is flash spun plexifilamentary film-fibril material such as Tyvek®, made from high density polyethylene, available from E. I. du Pont de Nemours and Company, Inc. Suitable flash spun plexifilamentary film-fibril materials may also be made from polypropylene. Other examples of nonwoven sheets useful in this embodiment of the present invention include spunbonded meltspun webs and composite sheets, spunbonded-meltblown-spunbonded composite sheets (SMS), spunbonded-film-spunbonded composite sheets (SFS) and spun-laced polyester/wood pulp composite sheets such as Sontara® and paper made from a fibrous material such as wood pulp or recycled paper. These different sheet materials are useful in different applications. For instance, according to the present invention, coated Tyvek® and coated paper are especially suited for use in heat sealed packaging (e.g., medical packaging) in which they reduce the incidence of fiber tear. Coated SMS, coated SFS and coated Sontara® are useful in applications where repellency of liquids is important, such as medical gowns, surgical drapes, etc.

The hydrostatic head of coated Tyvek® sheet with a coating thickness of up to approximately 0.5 μm in accordance with this embodiment of the invention has also surprisingly been found to be substantially equivalent to that of uncoated Tyvek® sheet. This has been especially unexpected in the case of hydrophilic coatings, which allow water to wet and spread onto the surface of Tyvek®, which is inherently hydrophobic. By 'substantially equivalent hydrostatic head' is meant that the hydrostatic head of the coated Tyvek® sheet is within 34% of the hydrostatic head of the uncoated Tyvek® sheet, which is within the normal variation of hydrostatic head in Tyvek®. For coating thickness greater than 0.5 μm we have observed the variation in the hydrostatic head of vapor deposition coated Tyvek® to be within 75% of the hydrostatic head of uncoated Tyvek®.

According to another embodiment of the invention, a fibrous porous sheet material is coated in such a way that the fibers of the sheet material are coated individually while leaving the interstitial spaces between the fibers substantially uncovered by the coating material. By "substantially uncovered" is meant that at least 35% of the interstitial spaces between the fibers are free of coating.

Suitable materials for use in the coating layers of the coated substrates include vacuum compatible monomers, oligomers or low MW polymers and mixtures thereof. Vacuum compatible monomers, oligomers or low MW polymers should have high enough vapor pressure to evaporate rapidly in the evaporator without undergoing thermal degradation or polymerization, and at the same time should not have vapor pressure so high as to overwhelm the vacuum system. The ease of evaporation depends on the molecular weight and the intermolecular forces within the monomers, oligomers or polymers. Typically, vacuum compatible monomers, oligomers and low MW polymers useful in this invention can have weight average molecular weights up to approximately 1200. Vacuum compatible monomers used in this invention should be radiation polymerizable, either alone or with the aid of a photoinitiator, and include acrylate monomers functionalized with hydroxyl, ether, carboxylic, sulfonic acid and other functionalities. Vacuum compatible oligomers or low molecular weight polymers include diacrylates, triacrylates and higher molecular weight acrylates functionalized as described above, aliphatic, alicyclic or aromatic oligomers or polymers and fluorinated acrylate oligomers or polymers. Fluorinated acrylates, which exhibit very low intermolecular interactions, useful in this invention can have weight average molecular weights up to approximately 6000. Preferred acrylates have at least one double bond, and preferably at least two double bonds within the molecule, to provide high speed polymerization. Examples of acrylates that are useful in the coating of the present invention and average molecular weights of the acrylates are described in U.S. Pat. No. 6,083,628 and WO 98/18852.

The coating material may be a crosslinked hydrophilic compound or composition. Examples of such compounds are mono-, di- and tri-acrylates functionalized with groups such as hydroxyl, ether, carboxylic acid, sulfonic and amine groups. Such materials are particularly suitable as coatings for nonwoven and paper sheets to be used as printing substrates. The ink adhesion of sheet materials coated with crosslinked hydrophilic compounds is improved. Ink pick-off from flexographic printing on Tyvek® coated according to this invention is virtually non-existent compared with similar printing on uncoated Tyvek®. Also, the ink rub-off resistance when rubbing with gasoline from flexographic printing on Tyvek® coated according to this invention is virtually eliminated compared with uncoated Tyvek®. Such materials are also suitable as coatings for sheets to be used in heat sealing applications.

Alternatively, the coating material may be a hydrophobic compound or composition. The coating material may be a crosslinkable, hydrophobic and oleophobic fluorinated acrylate, according to one preferred embodiment of the invention. Such a coating is generally useful in applications in which alcohol, water and/or oil repellency is desired. When a crosslinkable hydrophobic and oleophobic fluorinated acrylate is used as the coating material, it has been found that the coated nonwoven sheet of the present invention can have an alcohol/water repellency rating between 6 and 10. A rating of 10 means that a drop of neat isopropanol does not penetrate the sheet, but rather remains on the surface. The coated sheet can also have an oil repellency rating between 3 and 6. Such coated nonwoven sheet materials are especially useful in medical garment applications in which blood or fluid strike-through is sought to be avoided. Typical sheet materials used in medical garments (e.g., gowns, masks, boots, etc.) which are useful in this application are flash spun plexifilamentary film-fibril structures such as Tyvek®, spunbonded meltspun webs and composite sheets, spunbonded-meltblown-spunbonded composite sheets (SMS), spunbonded-film-spunbonded composite sheets (SFS), spun-laced polyester/wood pulp composite sheets such as Sontara®, and others. The exact level of repellency depends on the nature of the coating material and the amount of coating present on the nonwoven sheet which, in turn, depends on the speed of the coating line, the flux of vapor condensing onto the substrate and the polymerization efficiency of the electron beam or the UV radiation. The level of repellency also depends on the material that the nonwoven sheet is made of, the structure of the nonwoven sheet and its porosity and pore size distribution. For example, SMS structures are typically more porous so that imparting repellency to them is more challenging than to Tyvek® structures used in medical packaging. According to one embodiment of the invention, a fibrous sheet material coated with a hydrophobic fluorinated acrylate may be further coated with an absorbent hydrophilic coating.

When a crosslinkable hydrophobic and oleophobic fluorinated acrylate is used as the coating material on paper, it has been found that the paper, which prior to coating has no alcohol/water or oil repellency, shows alcohol/water and oil repellency comparable to similarly coated nonwovens. Such coated paper is especially useful in medical applications.

Figure 3:
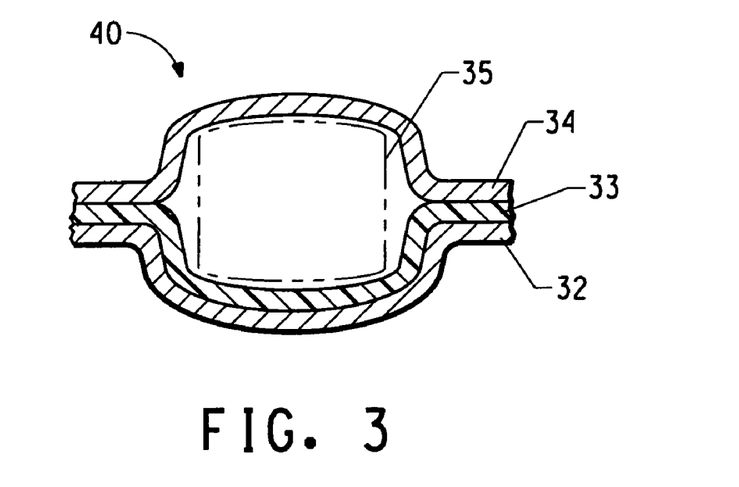
FIG. 3 is a cross-sectional view of a heat sealed package.

It has been found that the coated sheet material of the invention is well suited for use in packaging wherein the coated surface of the coated sheet material is heat sealed to a second material to form a pocket capable of containing an article. Such packaging is commonly used to package medical devices such as surgical instruments, which are sterilized in the package and are required to remain sterile as they are removed from the package to be used. A cross-sectional view of a heat sealed package according to the present invention is shown in FIG. 3. The package 40 comprises a first sheet material 32 having a coating 33 thereon which is heat sealed to a second material 34, the coated sheet and the second material cooperating to form a void capable of containing an article 35. In order to be useful in medical packaging, the sheet material must be porous to sterilizing gases. The second material may comprise a nonwoven sheet such as, but not limited to, a spunbonded plexifilamentary nonwoven sheet; it may also comprise a coated polymeric film such as poly (ethylene terephthalate) (PET), a thermoformable film such as Surlyn® coextruded with poly(ethylene-co-vinyl acetate)

Figure 2:
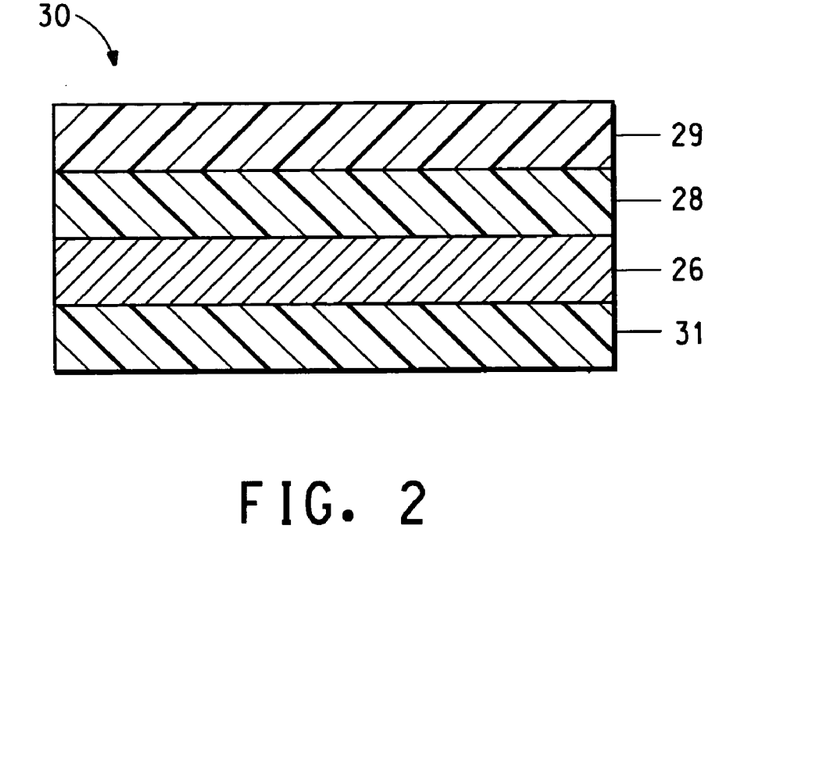
FIG. 2 is a cross-sectional view of a coated substrate in accordance with one embodiment of the present invention.

(i.e., EVA/Surlyn®/EVA), nylon, a preformed tray or paper. Preferably in heat sealed packaging applications, the coating on the sheet material comprises two layers, as shown in FIG. 2. The first layer 28 adjacent the sheet material 26 being a polyacrylate, and the second layer 29 adjacent the first layer being a mixture of hydrocarbon oligomers and/or poly(acrylate) oligomers.

Both sides of the first sheet material may be coated, for instance when one side is to be heat sealed to a second material to form a package and the other side is to be printed. Referring again to FIG. 2, sheet 30 for use in heat sealed packaging may also comprise coating 31 on the surface opposite the first layer 28 to enhance printability.

A benefit of the present invention is that the incidence of fiber tear upon the opening of a heat sealed package made from a coated fibrous sheet material of the invention, i.e., when the heat-sealed sheets are separated from each other, is virtually eliminated. It is believed that this is because the peeling does not occur directly on the surface of the fibrous sheet. In the case of a single layer coating, peeling occurs between the single layer coating and the second material. This is also achieved by coating the fibrous sheet with two coating layers and by choosing the adhesion and heat-seal strengths of the coating layers appropriately. The first coating layer 28 can be a protective layer of a thermoset crosslinked polyacrylate having an adhesion to the substrate greater than the adhesion between the first and the second coating and between the second coating and the second material. The second coating layer 29, applied directly to the first coating layer, comprises hydrocarbon oligomers or a blend of hydrocarbon oligomers with functionalized acrylate oligomers heat-sealable to the second sheet material which cooperates with the coated sheet to form the package, typically a thermoformable film. The second coating layer must adhere to the first coating layer, and must adhere to the second material with a heat seal strength that is less than the adhesion of the first coating layer to the first sheet.

The total thickness of the coating can be from about 0.05 to 5 micrometers, preferably between about 0.2 to 3 micrometers, more preferably between about 0.2 to 2 micrometers. In a particularly preferable embodiment, the protective polyacrylate layer is about 1 micrometer thick and the heat-sealable layer comprising hydrocarbon oligomers is about 1 micrometer thick.

For certain medical packaging wherein the first sheet is a fibrous sheet material and the second material is a film, it is typical for the adhesion strength between the first and second coating layers to be about 175 to about 350 N/m, which should also be the level of seal strength between the second layer and the film. When these conditions are fulfilled, peeling occurs away from the surface of the fibrous sheet material, either between the two coating layers, or between the second coating layer and the film. The peeling will then occur in one of two ways. Either the first coating layer remains on the fibrous sheet material and the second coating layer peels away from the first coating layer, or both coating layers remain on the fibrous sheet material and the film peels away from the second coating layer. In either case, the peeling does not occur directly on the exposed fibrous sheet material surface and therefore substantially no fiber tear results when the package is opened. By "substantially no fiber tear" is meant that no fiber tear occurs in the nonwoven sheet in at least 90% of the packages that are opened, as exemplified below.

Reducing fiber tear is especially challenging in the case of fibrous paper, which inherently is less resistant to puncture, tear propagation and fiber tear. Applying one or two coating layers to the surface of a fibrous paper according to the present invention ensures that peeling does not occur directly on the surface and significantly improves the performance with respect to fiber tear.

According to one embodiment for heat sealing applications, the first coating layer comprises a crosslinked polyacrylate-based formulation to prevent fiber tear, and the second coating layer comprises thermoplastic oligomers/polymers, or a mixture of oligomers, or a mixture of oligomers and polyacrylates for heat sealing. The hydrophobic hydrocarbon oligomers may be aliphatic, alicyclic or aromatic. In the case of coatings of hydrocarbon oligomers, no polymerization step is necessary as hydrocarbon oligomers solidify readily upon condensation and cooling. Materials useful for heat sealing applications must soften or melt at temperatures, dwell times and pressures that can produce robust seals without damaging or altering the properties of the substrate or the second material. Aliphatic, alicyclic and aromatic hydrocarbon oligomers and their blends with functionalized acrylate monomers are useful starting materials to meet these requirements.

Hydrocarbon oligomers are hydrophobic, but not oil or alcohol repellent, therefore they are not useful as the outer coating layer in embodiments of the invention to be used in applications where repellency of alcohol and oil is required.

Additional coating layers may be deposited on the first coating layer. Too thick a coating may result in a reduction of the air permeability of the sheet material; however, according to this embodiment of the invention, the interstitial spaces between the fibers remain substantially uncovered by the coating material.

The nonwoven or paper sheet, coated on one surface with a hydrophobic hydrocarbon oligomer compound for use in heat sealing applications according to the present invention, may also be coated with a cross-linkable hydrophilic coating on the opposite surface to provide good ink adhesion for printing of package design, etc., without compromising the hydrostatic head properties of the substrate.

In any of the above embodiments, the coating material may include pigments or dyes to impart color to the surface of the coated sheet material. In the case that both sides of the sheet are coated with different coating materials, the resulting sheet may have a different color on each side. During the vapor deposition process, masks can be placed between the slit that the vapor exits the evaporator and the sheet to be coated in order to impart a desired design to the coated sheet.

In any of the above embodiments, the coating material may include other known additives, including additives to impart antistatic and antimicrobial functionality.

According to yet another embodiment of the present invention, a heat sealed package is provided as described above with the exception that the coated sheet is a polymeric film rather than a nonwoven sheet or paper. Preferably, the film is coated with formulations as described herein of a polyacrylate, then a hydrophobic composition containing a polyacrylate on the side that is heat sealed. The opposite side of the film may also be coated with a hydrophilic compound or composition to promote good ink adhesion in the case that the film is to be printed. The thickness of the coating is 0.05-2 µm.

The improved properties that are realized with the present invention are made more apparent by the following non-limiting examples.

EXAMPLES

In the non-limiting examples that follow, the following test methods were employed to determine various reported characteristics and properties. ASTM refers to the American Society of Testing Materials. ISO refers to the International Standards Organization. TAPPI refers to Technical Association of Pulp and Paper Industry.

Basis weight was determined by ASTM D-3776, which is hereby incorporated by reference and reported in $g/m^2$.

Seal Strength of heat seals was measured according to ASTM F88-00. The load cell was set at 2.248 lbs. (10 Newtons).

Seal integrity of heat seals was tested according to ASTM F1929-98.

Hydrostatic head was measured using ISO 811, which is hereby incorporated by reference and is reported in cm of water. This test measures the resistance of a sheet to the penetration of liquid water under a static load. A 100 $cm^2$ sample is mounted in a Shirley Hydrostatic Head Tester (manufactured by Shirley Developments Limited, Stockport, England). Water is pumped against one side of the sample until three points of leakage appear on the surface.

Oil repellency was measured as follows. A drop of each of the solutions in Table 1 was deposited on the surface of the sheet to be measured. If the liquid drop of a particular solution (1-6) does not wet the surface within 5 minutes, then the surface is considered phobic for that liquid.

TABLE 1

| Oil Repellency Rating | Composition |
|---|---|
| 1 | Kaydol (mineral oil) |
| 2 | 65/35 Kaydol/n-hexadecane |
| 3 | n-hexadecane |
| 4 | n-tetradecane |
| 5 | n-dodecane |
| 6 | n-decane |

Alcohol/water repellency was measured as follows. Fifteen droplets from each of 10 different solutions of alcohol in water, numbered from 1 to 10 according to % isopropanol (wherein the number represents the % isopropanol divided by 10), are placed 2.54 cm apart along the width of the sheet to be measured. The width of the sheet that is tested corresponds to the width of the roll sample that was vapor deposition coated. After 5 minutes, each droplet is examined for signs of wetting and penetration to the other side of the sheet. The alcohol/water repellency of the sheet is calculated as the number of the alcohol/water solution which caused the sheet to show signs of wetting minus one, which is also the highest number of solution at which there were no signs of wetting and penetration to the other side of the sheet.

Gurley Hill Porosity is a measure of the barrier of the sheet material for gases. In particular, it is a measure of how long it takes for a volume of gas to pass through an area of material wherein a certain pressure gradient exists. Gurley-Hill porosity is measured in accordance with TAPPI T-460 om-88 using a Lorentzen & Wettre Model 121D Densometer. This test measures the time of which 100 cubic centimeters of air is pushed through a 2.54 cm diameter sample under a pressure of approximately 12.45 cm of water. The result is expressed in seconds and is usually referred to as Gurley Seconds.

Frazier Permeability is a measure of air permeability of porous materials and is reported in units of $m^3/m^2/min$. It measures the volume of air flow through a material at a differential pressure of 1.27 cm water. An orifice is mounted in a vacuum system to restrict flow of air through sample to a measurable amount. The size of the orifice depends on the porosity of the material. Frazier permeability is measured in units of $ft^3/ft^2/min$ using a Sherman W. Frazier Co. dual manometer with calibrated orifice and the measurements were converted to $m^3/m^2/min$ by multiplying by a conversion factor of 0.3048.

Electron Spectroscopy for Chemical Analysis (ESCA) (also known as XPS or X-Ray Photoelectron Spectroscopy) is used to identify surface functional groups (e.g., C—C bonding as in polyethylene or hydrocarbon oligomers, —C(=O)O as in acrylates, etc.) and to provide semiquantitative surface elemental composition (i.e., atom %, that is the % of the atoms on the surface, i.e., carbon, oxygen, fluorine, etc., excluding hydrogen). The sampling depth of ESCA as used here is approximately 10 nm; consequently, the information that it provides is characteristic of the surface top chemistry. The ESCA spectra of the peeled surfaces of the fibrous substrate side were compared to those of the film side and to those of their respective control surfaces (i.e., the uncoated fibrous substrate, the coated fibrous substrate and the film). By matching the chemistry of the peeled surfaces, the location of the peeling was determined. In a single layer coating, peeling may occur either adhesively or cohesively. In adhesive peeling, the peeling occurs between the single layer coating and the fibrous substrate or between the single layer coating and the second material. In cohesive peeling, the peeling occurs within the single layer coating or within the fibrous substrate (i.e., fiber tear, determined also by visual inspection), or within the second material (i.e., film tear determined also by visual inspection). In two layer coatings, the peeling may occur adhesively between the coating layers or between a coating layer and the fibrous material or between a coating layer and the second material, or cohesively within any of the layers, or within the fibrous substrate or within the second material.

Ink Adhesion was measured by adhering a pressure sensitive adhesive tape to printed areas of printed substrates and then peeling it off. The ink transfer onto tape, also known as "ink pick-off," and the condition of the print after the peel were evaluated.

Ink Adhesion with gasoline rubbing was measured by dipping a cotton swab in gasoline and rubbing the cotton swab onto the print on a printed substrate. The level of print transferred onto the cotton swab and the smear of the print due to rubbing are evaluated. Since the test is subjective, the results are useful only when comparing results measured by the same operator.

Receding and advancing water contact angles were measured using a Rame-Hart: NRL C.A. Goniometer model 100-00-115. A syringe with the test fluid is lowered to the appropriate height above the surface of the test sample and a drop is dispensed that contacts the surface. The field of view is adjusted to be able to read the correct advancing and receding angles. The drop is then slowly expanded while the protractor is simultaneously adjusted. As the drop develops a constant shape as it is slowly moving, the advancing contact angle is read with the protractor as the tangent of the surface of the sample and the drop. For the receding angle, the test liquid is slowly withdrawn, collapsing the drop and causing it to retract. As the shape becomes constant and the protractor is simultaneously adjusted, the receding angle is read with the protractor as the tangent of the surface of the sample and the drop.

In the following examples, the benefits of the coatings of the present invention were investigated on two different Tyvek® flash spun plexifilamentary sheet materials, a first sheet material having a basis weight of about 74.6 $g/m^2$, hereinafter "Sheet A", and a second sheet material having a basis weight of about 55.9 $g/m^2$, hereinafter "Sheet B". Sheet A has found use in heat sealed medical packaging and in general performs very well. However in a typical heat sealing packaging line it is difficult to control the heat sealing temperatures in a narrow temperature window with temperatures creeping upward. Packages sealed at these higher temperatures tend to exhibit fiber tear when opened.

These problems are exacerbated when attempting to use Sheet B, having the lower basis weight, as the sealing material. For example, the lower basis weight material of Sheet B is much more susceptible to fiber tear upon opening of the package than the higher basis weight Sheet A material. Furthermore, when Sheet A or B are coated via conventional means they lose part of their gas permeability, which makes gas sterilization procedures, for example sterilization with ethylene oxide or steam, more inefficient, due to slower infusion of the sterilizing gas into the package and slower complete removal of the gas after sterilization.

The following examples demonstrate that coatings according to the present invention act to greatly reduce or even eliminate fiber tear, even in use of the lower basis weight material of Sheet B, and extend the useful heat sealing temperature range.

Examples 1-3

Surface Morphology of Vapor Deposition Coated Fibrous Substrates

Figure 4:
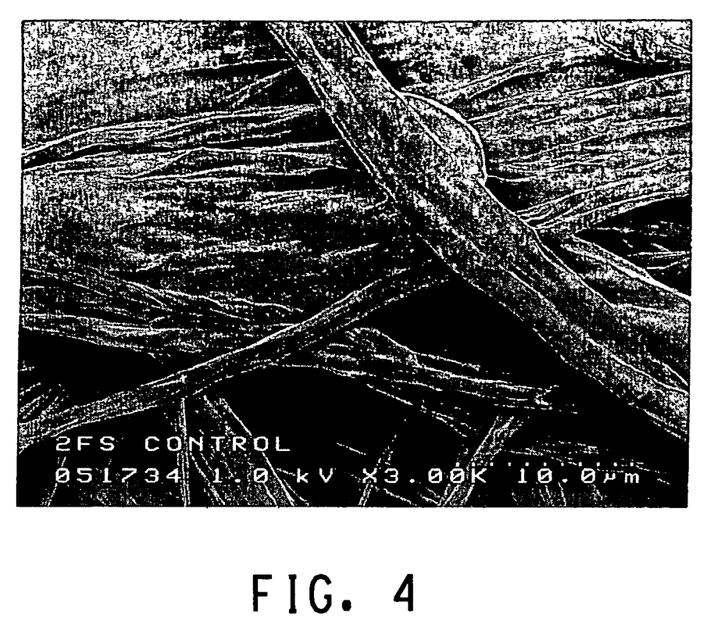
FIG. 4 is a scanning electron microscopy micrograph of a prior art uncoated control sample.

The chemistry of the vapor deposition coatings of the present invention and their physical structure (i.e., thickness, continuity, coverage and conformation with the surface of the substrate) determine the product functionalities that impart the improved properties of the present invention. FIG. 4 shows a Scanning Electron Microscopy (SEM) micrograph of a control sample of uncoated Sheet B ("Sheet B Control") at 3,000× magnification. The micrograph shows individual fibers and bundles of fibers that range in thickness from less than 1 μm for individual fibers to more than 10 μm for small bundles. Their interstitial spaces show layers of fibers and, although open, they support a certain height of liquid water (hydrostatic head) and allow gases to flow through while preventing particles and microbial spores from penetrating to the other side. The fibers on the surface may be connected at their intersections and appear flattened due to the bonding process that consolidates them into a strong structure.

Figure 5:
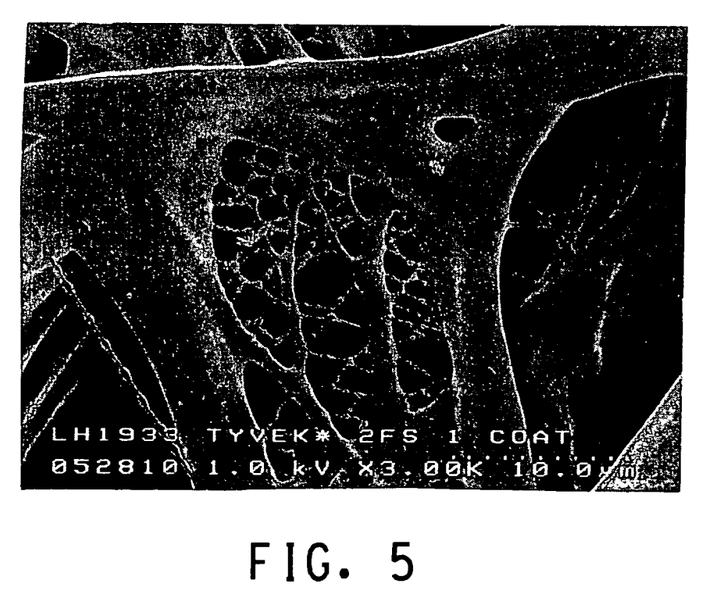
FIG. 5 is a scanning electron microscopy micrograph of a vapor deposition coated sample having a single coating layer according to the present invention.
Figure 6:
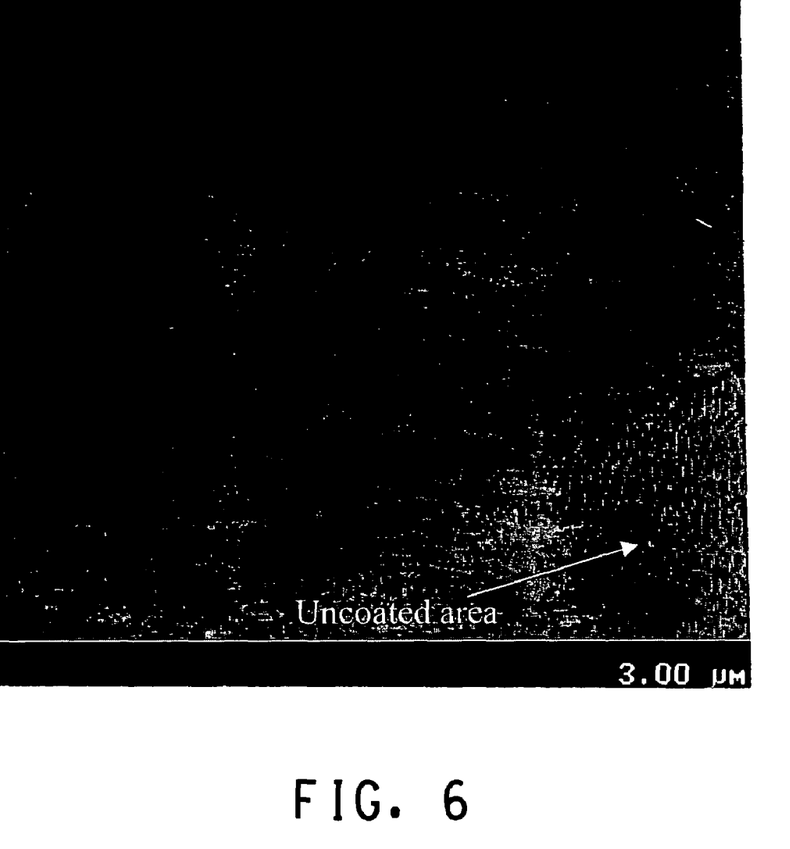
FIG. 6 is an atomic force microscopy micrograph of a vapor deposition coated sample having a single coating layer according to the present invention.
Figure 7:
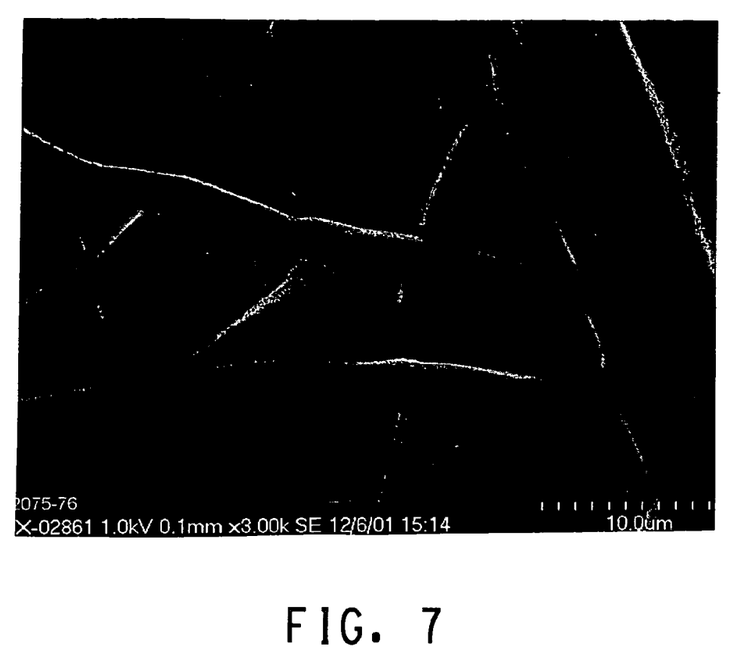
FIG. 7 is a scanning electron microscopy micrograph of a two-layer vapor deposition coated sample according to the present invention.

A 457.2 meter sample roll of Sheet B having a basis weight of 55.9 g/m$^2$ was treated with Ar/O$_2$ plasma at 200 W. The sample was then coated with an acrylate-based formulation functionalized with carboxylic and sulfonic acid groups, and hydroxyl and ether groups. The coating was then polymerized using an electron beam at 10 kV and 120 mA (Example 1). FIG. 5 is an SEM micrograph of Example 1 taken at the same magnification as the Sheet B Control. There is no significant visual difference between Example 1 and control, except that the coated fibers appear to be smoother than in the control sample. The coating conforms to the morphology of the fibers without filling the interstitial spaces, which still remain open. Example 2 was produced exactly as Example 1, except that the coating onto Sheet B consisted of a mixture of monoacrylate and hydrocarbon oligomers. FIG. 6 shows an Atomic Force Microscopy (AFM) micrograph of a 3 μm×3 μm area on the top side of a single fiber of Example 2. The smooth area in the figure shows the surface of the fiber that is covered by the coating. The rough area shows an uncoated part of the surface of the fiber. The roughness is due to the crystalline and amorphous domains of high density polyethylene on the surface of the fiber. The height difference between the coated and uncoated areas, which is equivalent to the height of the single coating layer, is approximately 45 nm. FIG. 7 is an SEM micrograph of a thicker two-layer vapor deposition coating onto Sheet B (Example 3). Example 3 was taken from a 457.2 meter sample roll of Sheet B which was treated with Ar/O$_2$ plasma at 200 W and subsequently coated with an monomeric acrylate-based formulation functionalized with carboxylic and sulfonic acid groups, and with hydroxyl and ether groups. The coating was then polymerized using an electron beam at 10 kV and 120 mA. Then onto the first coating a second coating of a mixture of monomeric acrylate and hydrocarbon oligomers was vapor deposited and polymerized under the same conditions as the first coating. There was no plasma treatment between the first and second coating. The coating of Example 3 shown in FIG. 7 appears to have covered some of the interstitial spaces, but still its thickness is much less than the thickness of the smallest fibers, since they are still visible and the coating conforms well with the surface of Tyvek® and the overall surface morphology of the fibers.

Figure 8:
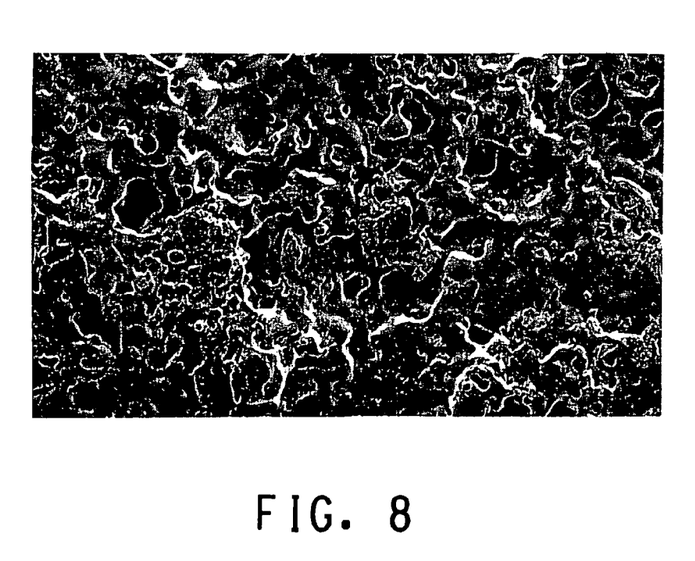
FIG. 8 is a scanning electron microscopy micrograph of a prior art conventionally coated sample.

FIG. 8 shows a conventional coating of Sheet B at 1,000× magnification. The coating completely covers the fibers; in fact, there is no evidence of the Tyvek® beneath it. Typical thickness of conventional coatings may range in the tens of μm. Gases still penetrate through these thick coatings but the breathability of Tyvek® is considerably reduced.

Examples 1 and 4

Contact Angle

The receding and advancing water contact angles were measured for the coated and uncoated sides of Example 1 as well as for both sides of an uncoated sample of Sheet B Control (Comparison 1). The advancing and receding contact angles were measured with water droplets using a drop-on-plate goniometer. The results are given in Table 2.

A sample of Sheet A having a basis weight of 74.6 g/m$^2$ was treated with plasma and coated in exactly the same manner as the Sheet B sample of Example 1.

The receding and advancing water contact angles were measured for the coated and uncoated sides of Sheet A (Example 4), as well as for both sides of an uncoated sample of Sheet A Control (Comparison 2). The results are given in Table 2.

TABLE 2

|  | Water Contact Angle (degrees) | |
| --- | --- | --- |
|  | Advancing | Receding |
| *Example 1* | | |
| Coated side | 0 | 0 |
| Uncoated side | 124 | 74 |
| *Comparison 1* | | |
| Uncoated side 1 | 132 | 64 |
| Uncoated side 2 | 133 | 72 |
| *Example 4* | | |
| Coated side | 0 | 0 |
| Uncoated side | 124 | 73 |
| *Comparison 2* | | |
| Uncoated side 1 | 124 | 66 |
| Uncoated side 2 | 131 | 68 |

Contact angles of zero indicate that water spreads and wets the surface of the sample upon contact, while contact angles greater than 100 degrees indicate that the water does not wet the surface at all.

As can be seen from the results in Table 2, the coated sides of Examples 1 and 4 of the present invention are hydrophilic such that water spreads and wets them immediately upon contact. This is contrasted with the uncoated sides of Examples 1 and 4, which remain hydrophobic, such that water droplets do not spread but remain as droplets on their surface. The uncoated sides of Examples 1 and 4 remain hydrophobic like the uncoated Tyvek® of Comparison 1 and 2. These coatings provide significant hydrophilicity to Tyvek®, which is specific to the surface of the side the coatings are applied to, leaving the other side unaffected.

Examples 5 and 6

Heat Sealability of Crosslinked Acrylates to LDPE/Mylar® and to Thermoformable Film A 457.2 meter sample of Sheet B was treated with Ar/$O_2$ plasma at 100 W. The sample was then coated with a monomeric acrylate-based formulation functionalized with carboxylic and sulfonic acid groups, and hydroxyls and ether groups. The coating was polymerized with an electron beam at 10 kV and 100 mA. Coated sides of Sheet B sheets were then heat sealed to low density polyethylene (LDPE) coated Mylar® polyester film (LDPE/Mylar®) to form at least thirty heat seals in the form of strips at each heat sealing temperature ("Example 5 seals"). Various heat sealing temperatures were used to form the heat sealed strips from 116° C. to 143° C. For comparison, the same number of uncoated Sheet B Control sheets were also heat sealed to LDPE/Mylar® at the same heat sealing temperatures, dwell time and pressure ("control seals").

All of the seals, the Example 5 seals and the controls, were then peeled and each seal was judged to be "good" or not, based on whether or not there was any fiber tear on the Tyvek® sheet or film tear on the LDPE/Mylar® film. In good seals, the Tyvek® and film peeled away from each other cleanly with no fiber or film tear.

Figure 9:
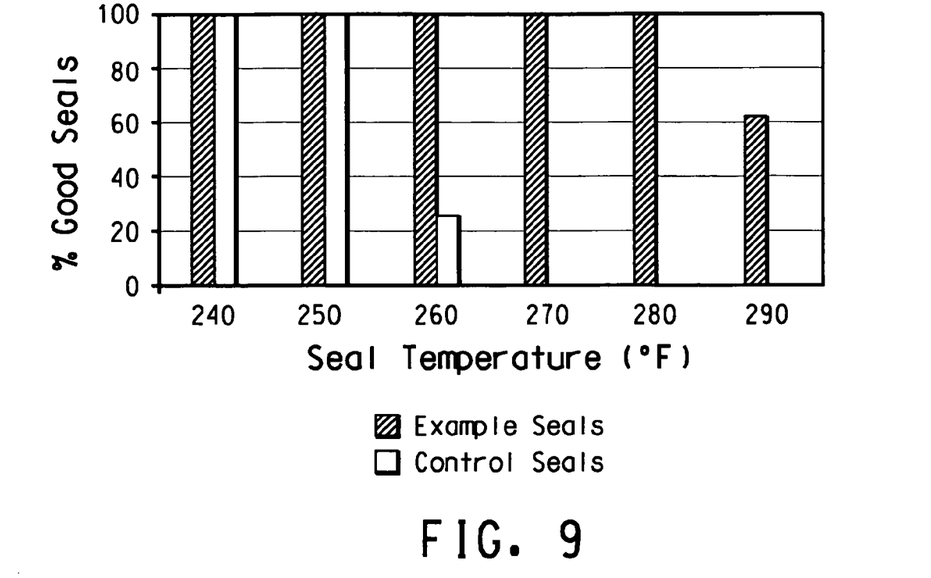
FIG. 9 is a bar graph comparing the percent good seals in heat sealed packages using coated sheet according to the invention compared with a control uncoated sheet at various heat seal temperatures.

FIG. 9 is a bar graph showing the percentage of good seals of the Example 5 and control seals. All of the seals that had been heat sealed at temperatures of 116° C. and 121° C. were good seals, but at heat sealing temperatures of 127° C. to 143° C., only the example seals are free of fiber tear. Even at the heat sealing temperature of 143° C., the example seals peeled without any fiber tear, although there was some film tear of the LDPE/Mylar®.

A 457.2 meter sample of Sheet A was coated using the process described herein under the same conditions and coating formulation as in Example 5. The coated surfaces of Sheet A sheets were then heat sealed to LDPE/Mylar® to form at least thirty heat seals in the form of strips for each heat sealing temperature ("Example 6 seals"). Various heat sealing temperatures were used to form the heat sealed strips from 116° C. to 149° C. For comparison, the same number of uncoated Sheet A Control sheets were also heat sealed to LDPE/Mylar® at the same heat sealing temperatures dwell time and pressures ("control seals").

Figure 10:
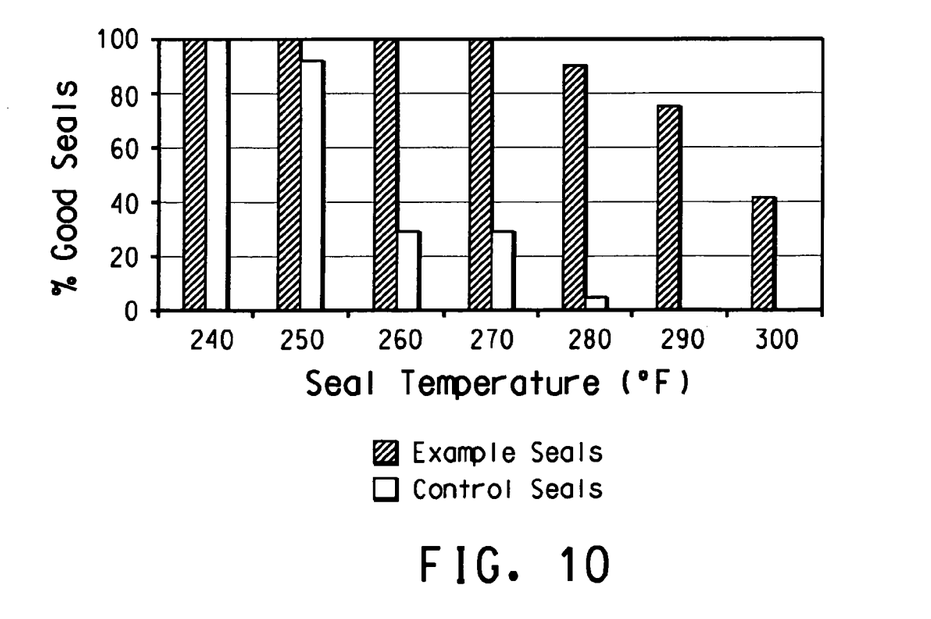
FIGS. 10-12 are bar graphs comparing the percent good seals in heat sealed packages using coated sheets according to the invention with control uncoated sheets at various heat seal temperatures.

FIG. 10 is a bar graph showing the percentage of good seals of the Example 6 and the control seals. All of the seals that had been heat sealed at 116° C. were good seals, but at heat sealing temperatures of 121° C. to 132° C., only the Example 6 seals are free of fiber tear. At heat sealing temperatures above 138° C., the example seals peeled with film tear of the LDPE/Mylar®, and no fiber tear, but the control seals exhibited both fiber and film tear.

The coated surfaces of Examples 5 and 6 were heat sealed at 132° C. to LDPE/Mylar® to form at least thirty seals ("Sheet B example seals" and "Sheet A example seals"). For comparison, the uncoated surfaces of Examples 5 and 6 were also heat sealed to LDPE/Mylar® at the same heat sealing temperature, dwell time and pressure ("control seals").

All of the seals, the examples and the controls, were then peeled and each seal was judged to be "good" or not based on whether or not there was any fiber tear on the Tyvek® sheet or film tear on the LDPE/Mylar® film.

Figure 11:
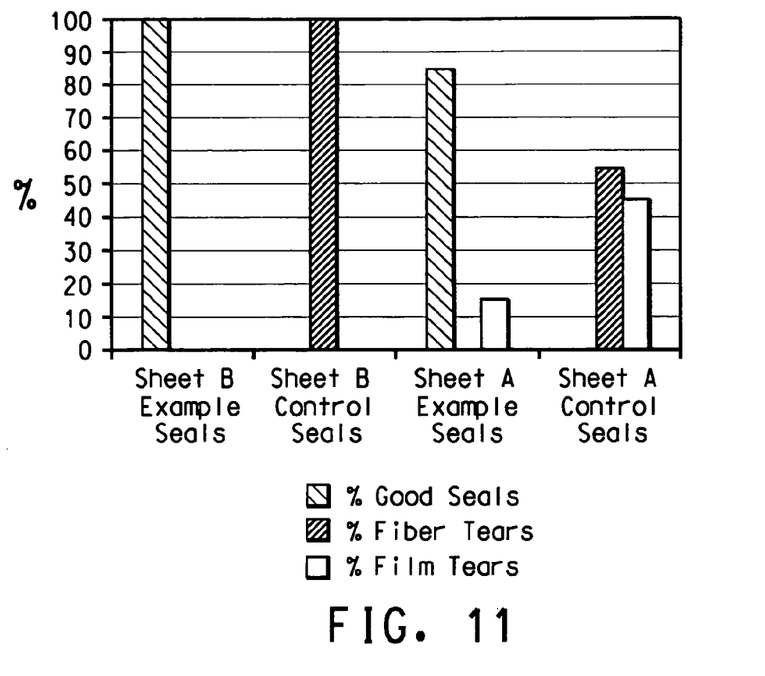

FIG. 11 is a bar graph showing the percent of the Sheet B example seals, the Sheet A example seals, the Sheet B Control seals and the Sheet A control seals, which were deemed to be "good" seals, the percent which exhibited fiber tear and the percent which exhibited film tear. All Sheet B example seals, i.e., those made with the coated side of Sheet B, were good and had no fiber tear, while all Sheet B control seals, i.e., those made with the uncoated side of the same sheet exhibited fiber tear. Similarly, most of the Sheet A example seals were good seals, free of fiber tear, although some of them exhibited film tear of the LDPE/Mylar®. All of the Sheet A control seals, however, exhibited fiber and film tear. These coatings impart to Tyvek® significant improvements in heat sealability, which are specific to the surface of the side the coatings are applied to, leaving the other side unaffected.

Five hundred pouches were made by heat sealing Example 5 to LDPE/Mylar®. The heat sealing conditions are summarized in Table 3. Two hundred and fifty of the packages were peeled open and no fiber tear was observed. The seal strength was also measured for each heat sealing condition (according to ASTM F88-00) and the results are included in Table 3. Four heat sealing samples were cut from the same location around the sealed area and tested from each of four pouches per heat sealing setting. The pouches that were measured were produced at the same time side-by-side along the width of the roll. The seal strength is the average of 16 measurements per heat sealing condition. Pouches made under the heat sealing conditions of Table 3 were tested (according to ASTM F1929-98) and no leaks were detected.

TABLE 3

| | | | Seal Strength | |
|---|---|---|---|---|
| Seal T (° C.) | Dwell time (s) | Pressure (kPa) | Unsupported (N/m) | Supported 180° C. (N/m) |
| 129 | 0.9 | 414 | 122.6 | 350.3 |
| 129 | 1.1 | 414 | 131.3 | 420.3 |
| 132 | 0.9 | 414 | 148.9 | 437.8 |
| 132 | 1.1 | 414 | 157.6 | 437.8 |

The coated Sheet B of Example 5 was also heat sealed to a thermoformable film consisting of a layer of Surlyn® ionomer resin between two layers of ethylene vinyl acetate (EVA/Surlyn®/EVA) (available from DuPont) to form at least 30 seals ("Example 5a seals"). Various heat sealing temperatures were used to form the seals from 121° C. to 154° C. For comparison, the same number of uncoated Sheet B Control sheets were also heat sealed to the EVA/Surlyn®/EVA film at the same heat sealing conditions ("control seals").

All of the packages, the Example 5a seals and the controls, were then peeled and each seal was judged to be "good" or not based on whether or not there was any fiber tear on the Tyvek® sheet or film tear on the film.

Figure 12:
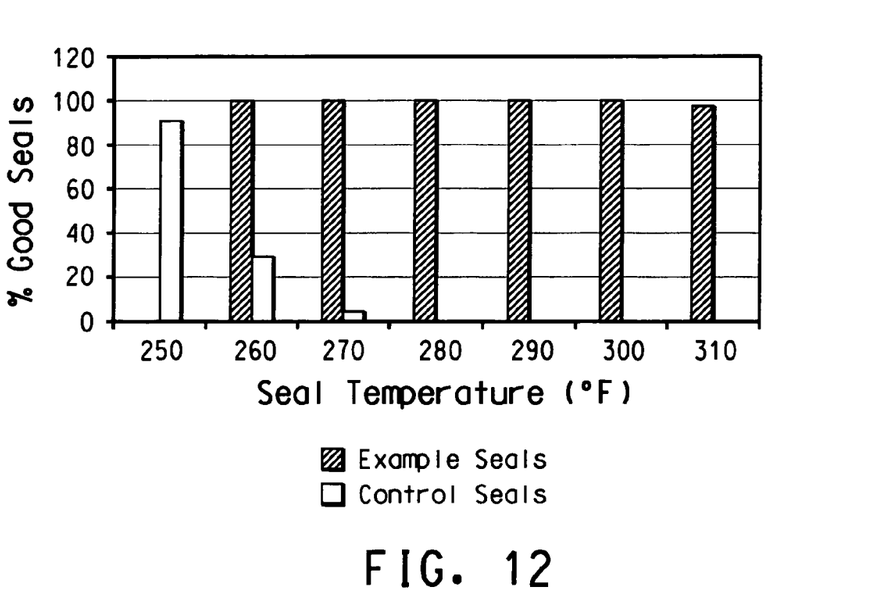

FIG. 12 is a bar graph showing the percentage of good seals of the Example 5a packages and the control packages. The use of the EVA/Surlyn®/EVA film resulted in no incidence of film tear, so that the heat seals were considered unacceptable only because of fiber tear of Sheet B. It is clear that the Sheet B Controls exhibited significant fiber tear when heat sealed at temperatures greater than 121° C., while the coated Sheet B of Example 5a produced good seals when heat sealed in the range of 127° C. to 154° C., although it became partially transparent at temperatures greater than 138° C.

Example 5

Adhesive Peeling Between Vapor Deposition Coating and LDPE/Mylar

Matched areas of peeled surfaces of the vapor deposition coated Sheet B and the LDPE/Mylar® sides of Example 5 seals were analyzed by ESCA. The ESCA spectrum of the peeled surface on the Tyvek® side is characteristic of carbon atoms bonded to other carbon atoms by single bonds and to oxygen atoms by single and double bonds, which is consistent with the acrylate coating and is the same as the spectrum of the vapor deposition coated Sheet B before heat sealing. The ESCA spectrum of the peeled surface on the LDPE/Mylar® side is characteristic of carbon atoms bonded to other carbon atoms by single bonds, which is indicative of the LDPE of the LDPE/Mylar® and it is the same as the spectrum of the LDPE/Mylar® before heat sealing. The ESCA spectra show that the peeling of heat seals of Example 5 occurs adhesively between the crosslinked acrylic coating on the surface of Sheet B and the LDPE of the Mylar® film. The presence of the crosslinked acrylic coating on the surface of the Tyvek® after peeling means two things. First, the crosslinked acrylic coating is more strongly adhered to the surface of the Tyvek® than to the LDPE/Mylar® and second the peeling did not occur directly on the surface of the Tyvek®, but rather between the crosslinked acrylic coating and the LDPE of LDPE/Mylar®. The heat seals of Example 5 showed no fiber tear unlike the control seals, which exhibited considerable fiber tear above 127° C.

Examples 7-9

Heat Sealability of Crosslinked Acrylates and Their Mixtures with Hydrocarbon Oligomers to LDPE/Mylar® and Thermoformable Films Example 7 is a 457.2 meter sample of Sheet B that was coated using the same process conditions as Example 5 with a mixture of monoacrylate/diacrylate functionalized with carboxylic and sulfonic acid groups and hydrocarbon oligomers. Example 8 is a 457.2 meter sample of Sheet A that was coated exactly as Example 7 except that it had a different diacrylate. Example 9 is a 457.2 meter sample of Sheet B that was produced using the same formulation and conditions as Example 6. Examples 7, 8 and 9 were then heat sealed to LDPE/Mylar® and to EVA/Surlyn®/EVA thermoformable film to form at least 200 packages for each heat sealing temperature. The heat sealing conditions and seal strength (unsupported) are presented in Table 4 below. Heat seals of Table 4 were tested (according to ASTM F1929-98) and no leaks were detected.

TABLE 4

| Sample | Seal T (° C.) | Dwell time (sec) | Pressure (kPa) | Seal Strength (N/m) |
|---|---|---|---|---|
| Examples 7 and 8 heat sealed to LDPE/Mylar ® | | | | |
| Example 7 | 126 | 0.6 | 275.8 | 245.2 |
| | 127 | 0.8 | 137.9 | 227.7 |
| Example 8 | 127 | 0.6 | 275.8 | 227.7 |
| | 127 | 0.8 | 275.8 | 315.2 |
| | 132 | 1 | 275.8 | 332.7 |
| Examples 7 and 9 heat sealed to thermoformable EVA/Surlyn ®/EVA | | | | |
| Example 7 | 132 | 1.2 | 345 | 157.6 |
| | 134 | 1.2 | 345 | 175.1 |
| Example 9 | 132 | 1.2 | 345 | 140.1 |
| | 135 | 1.2 | 345 | 157.6 |
| | 135 | 1.5 | 345 | 175.1 |

Examples 8 and 10

Peeling Under High Adhesive Loads

To further test the robustness of the coatings on the surface of Tyvek®, the following test was performed. The side to be tested of each of five 5.08 cm×10.16 cm samples was adhered to the top surface of a double-sided tape, selected to have slightly higher adhesion than a typical medical package, the other side of which was adhered to a rigid aluminum plate. To ensure good and reproducible adhesion of the samples to the double-sided tape, a 16.3 kg steel disk was rolled over the top of silicone rubber placed over the samples. A 2.54 cm tag end of the sample not adhered to the double-sided tape was attached to a high speed Instron tensile tester. A second 1.27 cm tag end at the other end of the sample was not allowed to be adhered to the tape. The Instron peeled the Tyvek® sample at an angle of nearly 180° and a peeling rate of 70 in/sec, a typical rate at which some medical packages are peeled open by a nurse in use. The force required to peel the 2 in wide sample from the double-sided tape was recorded. Then the Tyvek® sample was inspected for fiber tear as well as the tape for residues of the coatings and a determination was made whether there was a clean peel or fiber tear. Matched areas of the Tyvek® peeled side and the tape were also analyzed by ESCA to determine whether the peeling occurred between the Tyvek® and the first layer of coating, within the coating layer or between the coating layer and the tape. The test was performed for uncoated Sheet B Control, Example 8, Sheet B vapor deposition coated as in Example 7 with a mixture of diacrylate, monoacrylate and hydrocarbon oligomers (Example 10) and Sheet B coated with a thick conventional coating. The results are shown in Table 5.

TABLE 5

| Sample | Peel Force (N/m) | Fiber Tear (%) | Peeling |
|---|---|---|---|
| Sheet B (control) | 525.4 | 80 | Cohesive failure in Tyvek ® |
| Example 8 | 437.8 | 0 | Adhesive between coating and tape |
| Example 10 | 525.4 | 0 | Adhesive between coating and tape |
| Sheet B coated with conventional air knife coating | 175.1 | 0 | Cohesive in coating |

The results in Table 5 show that even at seal strengths as high as 437.8-525.4 N/m and fast peel rates, the vapor deposition coatings peel adhesively from the surface of the tape and remain intact on the surface of Tyvek® with no evidence of fiber tear. These results indicate that if the vapor deposition coated samples were heat sealed to a film with heat seal strengths as high as 525.4 N/m, then peeling would occur on the surface of the vapor deposited coatings with no fiber tear. Thick conventional coatings peel cohesively leaving residues on both the Tyvek® and film side at lower seal strength. Sheet B Control fails cohesively producing fiber tear in 80% of the samples tested under the conditions of the test.

Examples 3, 5, 6 and 11-18

Basis Weight, Gurley Hill Porosity and Hydrostatic Head

Table 6 compares the average values of basis weight (BW), Gurley Hill porosity (GH) and hydrostatic head (HH) of Examples 3, 5, 6, and 11-18 with the corresponding properties of Sheet B and Sheet A Controls. Examples 11-18 were prepared under the same process conditions as Example 6. Examples 11-13 were prepared by coating Sheet B and Examples 14-18 were prepared by coating Sheet A.

The aim and range for each of these properties for Sheet A and Sheet B are also listed in Table 6. The BW and GH of the vapor deposition coated samples are within the commercial Tyvek® product specifications. In fact, the commercial products cannot be distinguished from the vapor deposition coated samples with regard to BW or GH. Apparently, any modification that the vapor deposition coatings may have introduced to the samples is too small to influence these properties. The vapor deposition coatings, although they are so thin and light so as not to affect the GH and BW, do influence the HH of Sheet B and to a smaller extent that of Sheet A. The hydrostatic head of Example 3 was measured to be lower than the specifications for Sheet B Control. Also, in one Sheet A sample that was coated with two coatings, we measured the hydrostatic head of the coated side to be lower than the specification of the uncoated product.

TABLE 6

| | BW (g/m²) | GH (s) | HH (cm H₂O) Coated | HH (cm H₂O) Uncoated |
|---|---|---|---|---|
| Example 5 | 56.3 | 18 | 137 | 152 |
| Example 11 | 55.3 | 17 | 104 | 127 |
| Example 12 | 55.6 | 26 | 127 | 124 |
| Example 13 | 55.3 | 18 | 142 | 127 |
| Example 3 | 56.3 | 21 | 99 | 137 |
| Sheet B product specifications: | | | | |
| Aim | 55.9 | 18 | | 145 |
| Low | 52.9 | 8 | | 124 |
| High | 60.0 | 28 | | 165 |
| Example 6 | 78.6 | 22 | 165 | — |
| Example 14 | 75.6 | 19 | 140 | 140 |
| Example 15 | 74.9 | 22 | 107 | 107 |
| Example 16 | 75.9 | 18 | 152 | 150 |
| Example 17 | 76.3 | 24 | 107 | 150 |
| Example 18 | 75.9 | 19 | 41 | 122 |
| Sheet A product specifications: | | | | |
| Aim | 74.6 | 22 | | 157 |
| Low | 71.2 | 8 | | 104 |
| High | 78.0 | 36 | | 211 |

Examples 19-21

A 457.2 meter sample roll of Sontara® 8830 was vapor deposition coated with a fluoroacrylate formulation based on Zonyl®, including a photoinitiator, on both the poly(ethylene terephthalate) (PET) and the wood pulp sides (Example 19). The coating process and the polymerization of the coating were carried out in a vacuum atmosphere of $1.33 \times 10^{-4}$ kPa. The surfaces of the Sontara® were not plasma treated before coating since the formulation readily wets Sontara®.

Another sample of Sontara® 8830 was vapor deposition coated with the same formulation on both the PET and the wood pulp side under higher vacuum ($1.33 \times 10^{-5}$ kPa), higher vapor flux and faster polymerization (Example 20).

Another sample of Sontara® 8830 was vapor deposition coated with the same formulation on both the PET and the wood pulp side under similar conditions as Example 20 (Example 21). The polymerization of the coating was effected by an electron beam at 10 kV and 120 mA in Examples 19-21.

The oil and alcohol/water repellency were measured for each side of each sample. As a comparison, a sample of uncoated Sontara® 8830 (Control) was also tested. The data is given in Table 7.

TABLE 7

| | Oil Repellency | Alcohol/Water Repellency |
|---|---|---|
| Example 19 | | |
| PET side | 5 | 3 |
| Wood pulp side | 6 | 5 |
| Example 20 | | |
| PET side | 4 | 8 |
| Wood pulp side | 5 | 7 |
| Example 21 | | |
| PET side | 6 | 10 |
| Wood pulp side | 6 | 10 |
| Control | | |
| PET side | 0 | 0 |
| Wood pulp side | 0 | 0 |

As can be seen from the results, the coating imparts significant alcohol/water and oil repellency on either side of both samples as compared with uncoated Sontara® 8830, which has no alcohol/water or oil repellency. The level of repellency can be adjusted by appropriately tuning process parameters. The coatings in both examples did not affect the physical properties of Sontara® 8830.

What is claimed is:

1. A heat sealable package comprising:
   a first material which comprises a fibrous sheet, said first material having a coating covering at least one side, said coating comprising polyacrylate having a thickness between about 0.05 and about 5 μm; and
   a second material;
   wherein portions of the coated side of the first material can be heat-sealed to the second material such that the first material and the second material cooperate to form a void capable of containing an article; and
   wherein the coating comprises a first layer of cross-linked polyacrylate and a second layer of a compound selected from the group consisting of hydrocarbon oligomers and mixtures of polyacrylates and hydrocarbon oligomers.

2. The heat sealable package of claim 1, wherein the polyacrylate of the coating is selected such that when the sealed package is opened by separating the first material and the second material, substantially no fiber tear results.

3. The heat sealable package of claim 1, wherein the adhesion strength between the first layer and the first material is greater than 350.3 N/m, the adhesion strength between the first layer and the second layer is between 140.1 and 350.3 N/m and the adhesion strength between the second layer and the second material is between 175.1 and 350.3 N/m.

4. The heat sealable package of claim 1, wherein the second material is a nonwoven fabric.

5. The heat sealable package of claim 1, wherein the second material is a coated film.

6. The heat sealable package of claim 1, wherein the second material is a thermoformable film.

7. The heat sealable package of claim 1, wherein the second material is a rigid preformed tray.

8. The heat sealable package of claim 1, wherein the second material is paper.

9. The heat sealable package of claim 1, wherein the coating covers fibers of said fibrous sheet while leaving interstitial spaces between said fibers substantially uncovered.

10. The heat sealable package of claim 1, wherein said fibrous sheet is selected from the group consisting of flash spun plexifilamentary nonwoven sheet, spunbonded-meltblown-spunbonded composite sheet and fibrous paper.

11. A heat sealed package made from the heat sealable package of any of claims 1-10.

12. The heat sealed package of claim 11, wherein the heat seal between the first material and the second material has a seal strength of 140.1 to 350.3 N/m.

* * * * *